Nov. 7, 1961 P. KONIEWIEZ 3,007,690
SELF-SEALING ROTARY KILN
Filed Feb. 3, 1960
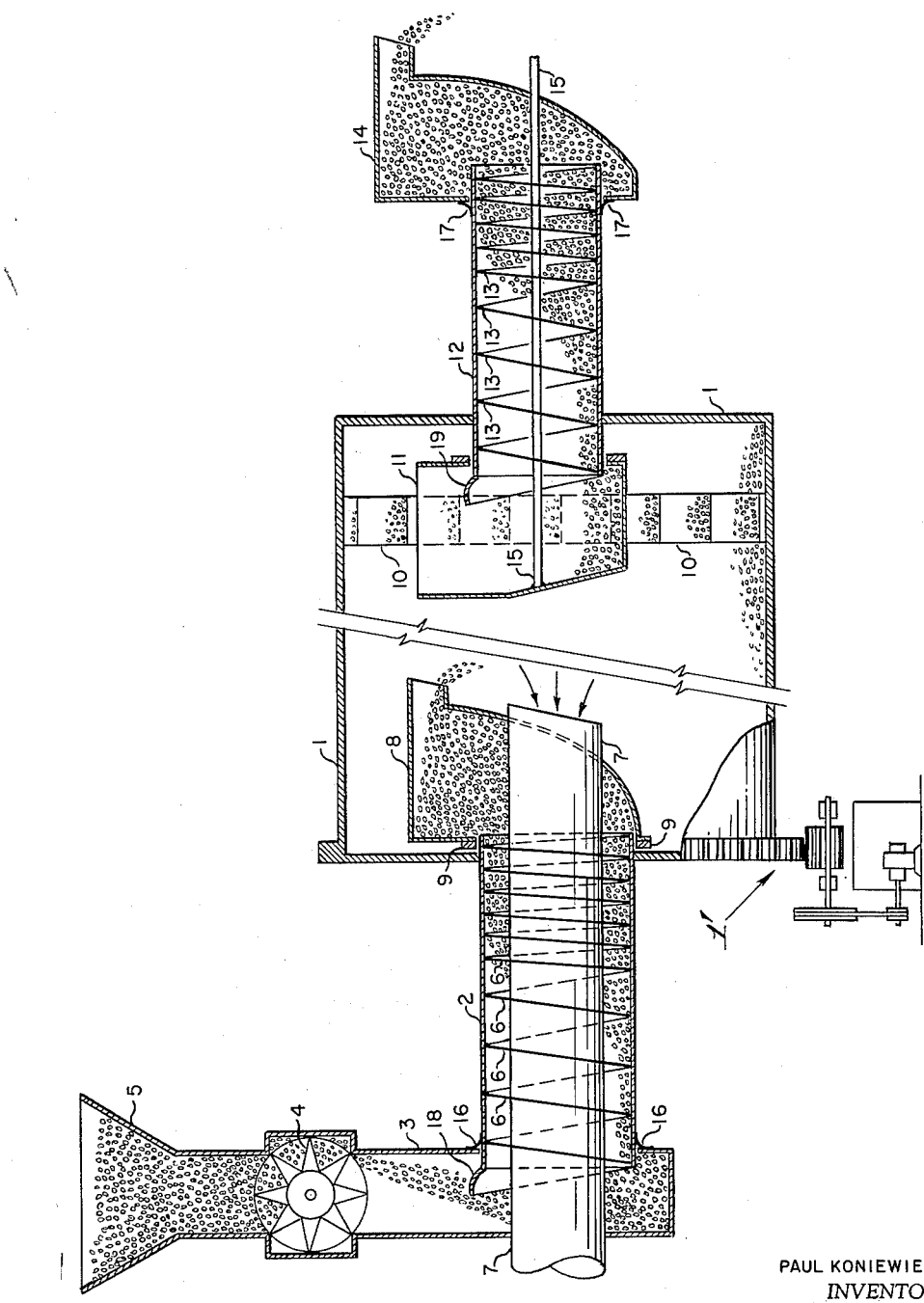
PAUL KONIEWIEZ
INVENTOR.
BY J. L. Chaboty
AGENT

# United States Patent Office 3,007,690
Patented Nov. 7, 1961

3,007,690
SELF-SEALING ROTARY KILN
Paul Koniewiez, Flushing, N.Y., assignor to Chemical Construction Corporation, New York, N.Y., a corporation of Delaware
Filed Feb. 3, 1960, Ser. No. 6,404
12 Claims. (Cl. 263—33)

This invention relates to rotary reaction kilns in which a solid material is fed into the vessel and gaseous and solid reaction products are withdrawn. Apparatus is provided for the simultaneous admittance of solid feed and withdrawal of gaseous and solid reaction products, in which the solid feed and solid reaction product act as seals to prevent escape of gaseous product. The apparatus of the present invention is also applicable to instances where a fluid feed is reacted or converted to produce gaseous and solid reaction products, and the solid reaction product is withdrawn while the gaseous product is not permitted to escape.

Various industrial processes involve the treatment or reaction of a solid feed in a rotating vessel and simultaneous withdrawal of a gaseous product or byproduct. Among these may be mentioned the various types of rotary kilns which are employed in different industries for high temperature thermal processing or drying of solids. In numerous instances the complete recovery of a gaseous component from the system is economically desirable, particularly when this component is the desired product of the process. In some cases complete recovery is essential for various reasons, such as when the gaseous component is poisonous or acts to pollute the atmosphere.

Typical of such situations is the production of hydrofluoric acid. This compound is produced by reacting solid calcium fluoride with sulfuric acid in a reaction kiln which is rotated and externally heated to insure complete reaction. The hydrofluoric acid is generated and withdrawn as hydrogen fluoride gas. This compound is very poisonous and highly corrosive, and consequently, the rotating reaction vessel must be thoroughly sealed against the atmosphere to prevent leakage. Usually the vessel is maintained at a pressure slightly below atmospheric, so that any leakage will result in a flow of air into the vessel rather than an outward flow of hydrogen fluoride. However, the effective sealing of the vessel is a serious problem, since process upsets may occur resulting in the generation of a positive pressure within the vessel. In addition, the inward flow of air reduces overall process efficiency.

Numerous types of mechanical or lubricated seals have been suggested or employed in various installations, however, these sealing means are open to various objections. Displacement of the apparatus due to wear or corrosive effect of the reaction product may cause a misfit of mechanical seals, while lubricated seals are also troublesome due to inevitable incorporation of solid material into the sealant.

In the present invention an apparatus arrangement is provided in which the solid feed itself is made to act as a sealant against gas flow, while permitting the simultaneous feeding of input solids and separate withdrawal of gaseous product. In addition, somewhat similar apparatus is provided whereby solid reaction product is withdrawn while leakage or loss of gaseous product is prevented.

On the solids feed end, a conduit is attached to and rotates with the reaction kiln. This conduit extends through an axially-centered opening into the kiln, and is provided with internal spiral flighting which is attached to the inner surface of the conduit but extends only part way to the center of the conduit, leaving a central void in the conduit. This flighting moves solid feed into the kiln as the conduit rotates, while gaseous product is withdrawn through a central stationary duct which is extended through the central void in the conduit and externally supported.

Sealing against gas flow of the annular space between the stationary duct and the rotating conduit and flighting is accomplished by two novel apparatus features, and preferably by the novel combination of these two features. First, the pitch angle of the flighting is decreased at a certain chosen section of the conduit. This results in a build-up of solid material at the particular section, with the result that the annular space between the duct and the conduit becomes filled with solid material at this section and is effectively plugged against gas flow. The second apparatus feature consists of a feed solids retention container, which is a stationary unit mounted on the duct within the kiln. The inner end of the rotating conduit extends through an opening in the container, whereby solid feed material passing through the conduit is directed into the container. The container is also provided with an opening for final dispersal of solid feed material into the kiln, and this opening is spaced at an elevation above the conduit so that the level of solid feed material is built up and maintained above the opening in the conduit. Thus an effective plugging of the end of the conduit against gas flow is maintained, while the inflow of solid feed material into the kiln is not hindered. The preferable mode of operation of the present invention comprises combining these two sealing means. This is accomplished by locating the flighting with lesser pitch angle at the inner end of the conduit, and at the same time providing the feed solids retention container disposed about the inner end of the conduit. Thus a continuous solids barrier against gas flow is provided. This barrier may be made as extensive as desired or required by merely providing more of the flighting with the lesser pitch angle or by placing the opening in the retention container for final solids feed dispersal at a higher elevation relative to the conduit. Any suitable feeder means may be employed to direct incoming solid feed material from an external source to the flighting in the annular space between the conduit and the duct, and external to the kiln. Additionally, entry of other reaction components such as liquid feed is readily accomplished by providing a liquid feed pipe within the stationary gas duct. This liquid feed pipe is thus readily extended to within the kiln, terminating at a suitable liquid dispersal opening.

Removal of solid reaction product from the kiln while preventing gas leakage is also accomplished in a novel manner using apparatus similar to the previously described feed solids entry apparatus. A rotating conduit provided with flighting is attached to the other end of the kiln, extending into the kiln through an axially-centered opening. This flighting is preferably of varying pitch, so as to provide blockage against gas flow in the manner previously described. A solids retention container is provided at the discharge end of the conduit, and this container is similar in configuration and function to the previously described feed solids retention container. Suitable means are provided within the kiln to direct reacted solids or solid reaction product to the conduit. These means may be attached to the kiln and rotate with the kiln. However, preferably these means will consist of a funnel-shaped stationary container within the kiln, supported by a beam, bar, or closed-end pipe extending into the kiln through the central void space in the conduit. This funnel-shaped container is provided with a lower opening whereby reacted solids are directed into the conduit. Scoops are provided, attached to the kiln wall, to pick up the solids and drop the material into the container. Thus the elements and operation of the reacted solids removal apparatus are similar to the solids feed entry apparatus, except for such items as the stationary gas removal duct. Of course a second or alternative stationary gas removal duct may be provided in conjunction with the reacted solids removal apparatus.

It is an object of this invention to provide a self-sealing apparatus for introducing solid feed material into a rotating reaction kiln and removing gaseous reaction product.

Another object is to provide an apparatus which permits simultaneous feed of solid material to a rotating kiln and withdrawal of gaseous product without leakage or loss of gaseous product.

A further object is to provide an apparatus which permits withdrawal of solid reaction product from a rotating kiln while preventing leakage or loss of gaseous product from within the kiln.

An additional object is to provide a self-sealing apparatus for the simultaneous introduction of solid feed material into a rotating reaction kiln, removal of reacted solids, and removal of gaseous reaction product.

Another object is to provide an apparatus which employs solid feed material being fed into a rotating kiln as a sealant to prevent gas leakage and allow withdrawal of gaseous product.

Still another object is to provide gas-tight apparatus for feed of fluorspar into a rotating kiln for reaction with sulfuric acid and simultaneous recovery of hydrogen fluoride gas and solid calcium sulfate, wherein gas leakage is prevented.

These and other objects of this invention will become evident from the description which follows.

Referring to the figure, which illustrates in combination a preferred embodiment of the present invention, the solids feed entry and gas product removal are shown on the left, while reacted solids removal is shown on the right portion of the figure. The wall of the rotary reaction kiln is indicated as 1 and having means for rotation indicated at 1'. In this case the kiln 1 and attached units are indicated as disposed with an essentially horizontal axis of rotation. However, it should be understood that the apparatus may be disposed and rotated about an axis which is somewhat inclined relative to the horizontal, in order to facilitate movement of solid material within the kiln itself.

With reference to the solid feed entry section of the apparatus, conduit 2 is attached to wall 1, extending through an axially-centered opening in the feed end of the kiln. Conduit 2 extends from within the kiln to solids transfer hopper 3, which directs incoming solid feed into conduit 2. Dust seal 16 prevents leakage of solids at this point. Hopper 3 is provided with rotary vane feeder 4 or other suitable device for controlled feeding of solids from storage hopper 5. Conduit 2 is provided with internal spiral flighting 6, which is attached to the inner surface of the conduit and extends inward to an inner perimeter, thus providing a central void space in the center of conduit 2. In this preferred embodiment, the pitch angle of flighting 6 is reduced over that section of the flighting near the kiln. Stationary gas duct 7 extends through the central void space within conduit 2 and into the kiln. Duct 7 serves to remove gaseous product from within the kiln. In this preferred embodiment, duct 7 also serves to support solid feed retention container 8. Container 8 has an opening disposed about the end of conduit 2, whereby solid feed material passing through conduit 2 is held within container 8 and only passes into the kiln through the upper opening in container 8. Sealing ring 9 is provided at the lower opening in container 8 to furnish a seal against solid leakage at this point, while allowing relative motion to take place between the stationary container 8 and rotating conduit 2. A stationary liquid feed pipe, not shown, may also be provided within stationary gas duct 7 to permit entry of liquid reactant. In the case of hydrofluoric acid manfacture, liquid sulfuric acid feed is preferably introduced in this manner.

In operation, the flow of solid feed from hopper 5 is regulated by feeder 4. Incoming solid feed material is picked up and removed from the bottom of hopper 3 by rotating flighting 6, which moves the solid material horizontally into the kiln by the well-known screw conveyor type of motion. Scoop 18 may be provided to facilitate solids pickup from hopper 3. As the solid feed material is moved through conduit 2 towards the kiln, that portion of flighting 6 with reduced pitch angle is encountered. As a result the solid material is forced upwards within the annular space between gas duct 7 and conduit 2 and consequently provides a solid plug seal against gas flow in the annular space. In addition, the solid feed material is forced further upwards by container 8 before dispersing into the kiln. Thus the solid feed material also acts as an effective plug seal against gas flow at the end of conduit 2 within the kiln. In this preferred embodiment the two sections of apparatus which provide the plug seal against gas flow are consolidated into a combination in which both plugging actions work together to provide an extensive unitary seal. However, it may be possible in some cases to operate without the retention container seal, relying solely on the variable pitch angle of the flighting to provide effective sealing, or vice versa. Where the variable pitch flighting is employed alone, it may prove advantageous in some cases to provide the flighting with minimum pitch angle at the central section of the conduit, rather than at the end section nearest to the kiln. Other variations will occur to those skilled in the art.

The solid feed material is finally dispersed into the kiln through the upper outlet opening in container 8. The gas product produced within kiln 1 passes out of the apparatus through stationary duct 7.

Referring now to the solids outlet apparatus shown on the right side of the figure, reacted solids or solid material formed within the kiln is picked up from the bottom of the kiln by scoops 10, which are attached to the inside wall of the kiln. The rotation of the kiln thus elevates the scoops and causes the solid material to drop into hopper 11, which is funnel-shaped or of other suitable configuration. The solid material thus passes into conduit 12 provided with flighting 13. Scoop 19 may be provided to facilitate passage of solid material into conduit 12. Conduit 12 is attached to the kiln in a manner similar to conduit 2 previously described, and has a similar function and mode of action. Thus the solid material builds up toward the outlet end of conduit 12 due to the reduced pitch angle of the flighting at that section. The outlet end of conduit 12 is also preferably extended into stationary retention container 14, which has a function and mode of action similar to container 8 previously described. Dust seal 17 prevents leakage of solids at this point. The reacted solids are finally withdrawn through the upper opening in container 14, while plug sealing of the solids outlet against gas flow is maintained.

Due to the fact that most kiln processes produce a solid reaction product of variable particle size, including lumps or cakes, in most cases it will be advisable to provide the solids outlet apparatus with both plug seals in combination.

Stationary beam 15 extends through the central void space within conduit 12 and serves to support stationary hopper 11. It should be understood that other known solids handling means besides scoops 10 and hopper 11 may be employed to direct the reacted solids into conduit 2. In some cases, solids handling means of this nature might even be completely eliminated, by allowing an inventory of material to build up at this end of the kiln until the excess spills into the conduit. In this case, a suitable scoop such as 19 could be provided, attached to the inner end of the conduit, to facilitate such material pick-up.

Finally, it should be understood that the apparatus of the present invention is limited to those cases in which it is possible for the solid material to act as a seal against gas flow. Usually the apparatus will be effective where the solid feed is a powdered or finely ground granular material. Where the solid is coarse-grained with effective inter-granular void spaces, utilization of the present apparatus to effect gas sealing may not be possible, since in this case the gas could permeate through the entire body of solid material. Thus in such cases the plug seal action generated by the apparatus of the present invention would not act to effectively prevent gas flow, and gas could escape through the apparatus. The possible application of the present invention to a specific installation is readily determined by a simple laboratory test, in which the depth of solid material required for zero gas flow is determined for the particular gas pressure differential to be encountered in the specific installation.

The feasibility of applying the apparatus of the present invention to hydrofluoric acid manufacture was conclusively shown by the following pilot plant study.

Tests of ground fluorspar were made to determine effectiveness of this material as a seal against gas flow. The fluorspar was ground to the standard fineness of the size distribution specified for hydrogen fluoride production, and the amount of gas flow through a one foot thick bed was measured for various gas pressure differentials across the bed. The following results were obtained:

| Gas Pressure Differential (inches of water) | Gas Leakage Flow (cubic feet of gas per hour per square foot of bed) |
| --- | --- |
| 2 | 0 |
| 5 | 3.5 |
| 10 | 7.0 |

Since commercial hydrogen fluoride installations are operated usually with a kiln vacuum maintained at about 2 inches of water negative pressure, it is apparent that the apparatus of the present invention is readily applicable to such installations.

I claim:

1. Rotary kiln with means for gas tight solids entry combined with gas removal, and means for gas tight solids removal, comprising a reaction kiln, means to rotate said kiln, a solids feed conduit extending within said kiln through a central opening in the feed end of said kiln and attached to said kiln whereby rotation of said kiln effects rotation of said conduit, helicoid spiral flighting disposed within said conduit and attached to said conduit, said flighting terminating at an inner perimeter whereby a central axial void space is provided within said conduit, a stationary gas outlet duct extending through said conduit within the inner perimeter of said flighting and into said kiln, a solids retention container mounted on said duct within said kiln and disposed about the inner end of said conduit whereby solid feed material passing through said conduit is directed into said container, said container having an outlet for dispersal of solid feed material into said kiln, said outlet being disposed at an elevation above said conduit whereby the level of solid feed material within said container is maintained above said solids feed conduit, means adjacent the outer end of said conduit for directing solids feed to said flighting, a reacted solids exit conduit extending from within said kiln through a central opening in the solids discharge end of said kiln and attached to said kiln whereby rotation of said kiln effects rotation of said exit conduit, helicoid spiral flighting disposed within said exit conduit and attached to said exit conduit, a reacted solids retention container disposed about the outer end of said exit conduit whereby reacted solids passing through said exit conduit are directed into said container, said reacted solids retention container having an outlet for final reacted solids egress which is disposed at an elevation above said exit conduit whereby the level of reacted solids material within said container is maintained above said exit conduit, and means within said kiln adjacent the inner end of said exit conduit for directing reacted solids into said exit conduit.

2. Apparatus of claim 1, in which said helicoid spiral flighting disposed within said feed conduit is provided with flights of varying pitch angle, whereby a section of the annular space between said duct and said conduit is effectively plugged with solid feed material and gas flow through said annular space is prevented.

3. Apparatus of claim 2, in which the pitch angle of flights near said solids retention container is less than the pitch angle of the balance of said flights, whereby solid food material is accumulated and elevated within said conduit at the section adjacent said container, thereby providing additional effective sealing against gas flow within said conduit.

4. Apparatus of claim 1, in which said helicoid spiral flighting disposed within said exit conduit is provided with flights of varying pitch angle, whereby a section of said conduit is effectively plugged with solid material and gas flow through said conduit is prevented.

5. Apparatus of claim 4, in which the pitch angle of flights near said reacted solids retention container is less than the pitch angle of the balance of said flights, whereby reacted solids material is accumulated and elevated within said conduit at the section adjacent said container, thereby providing additional effective sealing against gas flow within said conduit.

6. Rotary kiln with means for gas tight solids entry combined with gas removal, and means for gas tight solids removal, comprising a reaction kiln, means to rotate said kiln, a solids feed conduit extending within said kiln through a central opening in the feed end of said kiln and attached to said kiln whereby rotation of said kiln effects rotation of said conduit, helicoid spiral flighting disposed within said conduit and attached to said conduit, said flighting terminating at an inner perimeter whereby a central axial void space is provided within said conduit, a stationary gas outlet duct extending through said conduit within the inner perimeter of said flighting and into said kiln, means adjacent the outer end of said conduit for directing solids feed to flighting, said flighting comprising flights of varying pitch angle, whereby a section of the annular space between said duct and said conduit is effectively plugged with solid feed material and gas flow through said annular space is prevented, a reacted solids exit conduit extending from within said kiln through a central opening in the solids discharge end of said kiln and attached to said kiln whereby rotation of said kiln effects circular rotation of said exit conduit, helicoid spiral flighting disposed within said exit conduit and attached to said exit conduit, said flighting comprising flights of varying pitch angle, whereby a section of said conduit is effectively plugged with solid material and gas flow through said conduit is prevented, and means within said kiln adjacent the inner end of said exit conduit for directing reacted solids into said exit conduit.

7. Apparatus of claim 6, combined with a solids retention container mounted on said gas outlet duct within said kiln and disposed about the inner end of said solids feed conduit whereby solid feed material passing through said conduit is directed into said container, said container having an outlet for dispersal of solid feed material into said kiln, said outlet being disposed at an elevation above said conduit whereby the level of solid feed material within said container is maintained above said solids feed conduit.

8. Apparatus of claim 6, combined with a reacted solids retention container disposed about the outer end of said exit conduit whereby reacted solids passing through said exit conduit are directed into said container, said reacted solids retention container having an outlet for final reacted solids egress which is disposed at an elevation above said conduit whereby the level of reacted solids material within said container is maintained above said exit conduit.

9. Rotary kiln with means for gas tight solids entry combined with gas removal comprising a reaction kiln, means to rotate said kiln, a solids feed conduit extending within said kiln through a central opening in the feed end of said kiln and attached to said kiln whereby rotation of said kiln effects rotation of said conduit, helicoid spiral flighting disposed within said conduit and attached to said conduit, said flighting terminating at an inner perimeter whereby a central axial void space is provided within said conduit, a stationary gas outlet duct extending through said conduit within the inner perimeter of said flighting and into said kiln, means adjacent the outer end of said conduit for directing solids feed to said flighting, and said flighting comprising flights of varying pitch angle, whereby a section of the annular space between said duct and said conduit is effectively plugged with solid feed material and gas flow through said annular space is prevented.

10. Apparatus of claim 9 combined with a solids retention container mounted on said gas outlet duct within said kiln and disposed about the inner end of said solids feed conduit whereby solid feed material passing through said conduit is directed into said container, said container having an outlet for dispersal of solid feed material into said kiln, said outlet being disposed at an elevation above said conduit whereby the level of solid feed material within said container is maintained above said solids feed conduit.

11. Rotary kiln with means for gas tight solids entry combined with gas removal comprising a reaction kiln, means to rotate said kiln, a solids feed conduit extending within said kiln through a central opening in the feed end of said kiln and attached to said kiln whereby rotation of said kiln effects rotation of said conduit, helicoid spiral flighting disposed within said conduit and attached to said conduit, said flighting terminating at an inner perimeter whereby a central axial void space is provided within said conduit, a stationary gas outlet duct extending through said conduit within the inner perimeter of said flighting and into said kiln, a solids retention container mounted on said gas outlet duct within said kiln and disposed about the inner end of said solids feed conduit whereby solid feed material passing through said conduit is directed into said container, said container having an outlet for dispersal of solid feed material into said kiln, said outlet being disposed at an elevation above said conduit whereby the level of solid feed material within said container is maintained above said solids feed conduit, and means adjacent the outer end of said conduit for directing solids feed to said flighting.

12. Rotary kiln with means for gas tight solids removal, comprising a reaction kiln, means to rotate said kiln, means for feeding reactant into said kiln, a solids exit conduit extending from within said kiln through a central opening in the solids discharge end of said kiln and attached to said kiln whereby rotation of said kiln effects rotation of said exit conduit, helicoid spiral flighting disposed within said exit conduit and attached to said exit conduit, said flighting comprising flights of varying pitch angle whereby a section of said conduit is effectively plugged with solid material and gas flow through said conduit is prevented, a solids retention container disposed about the outer end of said exit conduit whereby solid material passing through said exit conduit is directed into said container, said container having an outlet for final solids egress which is disposed at an elevation above said exit conduit whereby the level of solid material within said container is maintained above said exit conduit, and means within said kiln adjacent the inner end of said exit conduit for directing solid material into said exit conduit.

References Cited in the file of this patent

UNITED STATES PATENTS

| | | |
|---|---|---|
| 789,691 | Harper | May 9, 1905 |
| 970,705 | Hageman | Sept. 20, 1910 |
| 1,475,361 | Stogdale | Nov. 27, 1923 |
| 2,069,164 | Vogel-Jorgensen | Jan. 26, 1937 |
| 2,109,449 | Harman | Mar. 1, 1938 |
| 2,743,918 | Struckmann | May 1, 1956 |
| 2,932,557 | List et al. | Apr. 12, 1960 |
| 2,972,818 | Nebgen | Feb. 28, 1961 |

FOREIGN PATENTS

| | | |
|---|---|---|
| 65,656 | Denmark | Sept. 1, 1947 |